United States Patent
Hatta et al.

(10) Patent No.: US 8,304,082 B2
(45) Date of Patent: Nov. 6, 2012

(54) INTERMEDIATE FILM FOR LAMINATED GLASSES

(75) Inventors: Bungo Hatta, Shiga (JP); Takahiro Futamura, Shiga (JP); Minoru Inada, Shiga (JP); Hirofumi Kitano, Shiga (JP)

(73) Assignee: Sekisui Chemical Co., Ltd., Osaka (JP)

(*) Notice: Subject to any disclaimer, the term of this patent is extended or adjusted under 35 U.S.C. 154(b) by 0 days.

(21) Appl. No.: 13/003,356

(22) PCT Filed: Jul. 16, 2009

(86) PCT No.: PCT/JP2009/062910
§ 371 (c)(1),
(2), (4) Date: Feb. 28, 2011

(87) PCT Pub. No.: WO2010/008053
PCT Pub. Date: Jan. 21, 2010

(65) Prior Publication Data
US 2011/0151269 A1 Jun. 23, 2011

(30) Foreign Application Priority Data

Jul. 16, 2008 (JP) .................. 2008-184839
Mar. 26, 2009 (JP) .................. 2009-075614

(51) Int. Cl.
*B32B 9/00* (2006.01)
(52) U.S. Cl. .................... 428/426; 428/437
(58) Field of Classification Search .......... 428/426, 428/437
See application file for complete search history.

(56) References Cited

U.S. PATENT DOCUMENTS

| | | | |
|---|---|---|---|
| 2,889,297 A | 6/1959 | Brandner et al. | |
| 4,293,615 A | 10/1981 | Bowen | |
| 4,390,594 A | 6/1983 | Dages | |
| 6,887,577 B1 | 5/2005 | Keller et al. | |
| 7,491,440 B2 * | 2/2009 | Fukatani et al. | 428/328 |
| 7,625,634 B2 * | 12/2009 | Fukatani et al. | 428/437 |
| 7,754,337 B2 * | 7/2010 | Hatta et al. | 428/437 |
| 2009/0305059 A1 | 12/2009 | Marumoto | |

FOREIGN PATENT DOCUMENTS

| | | | |
|---|---|---|---|
| JP | 59-111954 | * | 6/1884 |
| JP | 59-111954 | | 6/1984 |
| JP | 3-124440 | | 5/1991 |
| JP | 9-188547 | | 7/1997 |
| JP | 2007-331964 | | 12/2007 |
| WO | 2007/142095 | | 12/2007 |

OTHER PUBLICATIONS

International Search Report issued in International (PCT) Application No. PCT/JP2009/062910.
Supplementary European Search Report dated Jul. 25, 2012 in EP Application No. 09797977.7.
Z. M. Zhou et al., "Synthesis Characterization and Miscibility of Polyvinyl Butyrals of Varying Vinyl Alcohol Contents", Tr. J. of Chemistry, vol. 21, pp. 229-238, Aug. 15, 1997.

* cited by examiner

*Primary Examiner* — Leszek Kiliman
(74) *Attorney, Agent, or Firm* — Wenderoth, Lind & Ponack, L.L.P.

(57) ABSTRACT

The present invention has its object to provide an interlayer film for a laminated glass, which is excellent in penetration resistance, moisture resistance, and sound insulation.
The present invention relates to an interlayer film for a laminated glass, which comprises: a polyvinyl acetal resin; and a plasticizer, the plasticizer being represented by formula (1):

[Formula 1]

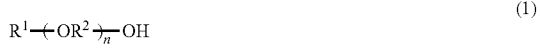

(1)

wherein $R^1$ represents a phenyl group, $R^2$ represents an alkylene group having 2 to 4 carbon atoms, and n represents 4 to 6.

11 Claims, No Drawings

INTERMEDIATE FILM FOR LAMINATED GLASSES

This application is a U.S. national stage of International Application No. PCT/JP2009/062910 filed Jul. 16, 2009.

TECHNICAL FIELD

The present invention relates to an interlayer film for a laminated glass, which is excellent in penetration resistance, moisture resistance, and sound insulation.

BACKGROUND ART

A laminated glass is a safety glass because few glass fragments are scattered even if it is broken by impact from the outside. Therefore, laminated glasses have been used widely for windowpanes of motor vehicles such as automobiles and railroads, aircrafts, buildings, and the like. One example which can be mentioned is a laminated glass which includes an interlayer film for a laminated glass interposed between and integrated with one pair of glass plates. The interlayer film for a laminated glass consists of a polyvinyl butyral resin and a plasticizer.

Laminated glasses that effectively insulate driving noise of an engine, wind noise, and other external noises have been demanded in recent years. As a laminated glass excellent in sound insulation, Patent Document 1, for example, discloses a laminated glass with an interlayer film for a laminated glass. Here, the laminated glass has two or more layers of plasticized polyvinyl acetal resin films laminated together.

Examples of a method for producing an interlayer film for a laminated glass excellent in sound insulation include a method in which a polyvinyl butyral resin with low hydroxyl group content is used, a method which includes adding an increased amount of a plasticizer to a polyvinyl butyral resin, and a method which includes adding a low-molecular-weight plasticizer.

However, use of the method in which a polyvinyl butyral resin with low hydroxyl group content is used causes such problems as deterioration of moisture resistance of a laminated glass. In addition, the interlayer film for a laminated glass that contains a polyvinyl butyral resin with low hydroxyl group content has only insufficient strength. Thus, penetration resistance of the laminated glass is problematically deteriorated.

In the method including adding an increased amount of a plasticizer to a polyvinyl butyral resin, or the method including adding a low-molecular-weight plasticizer, the plasticizer bleeds out onto the surface from the inner side of the interlayer film. This problematically causes difficulty in controlling the adhesion between an interlayer film for a laminated glass and glass plates. Also problematically, the increased amount of the plasticizer significantly reduces penetration resistance of a laminated glass.

PRIOR ART DOCUMENTS

Patent Documents

Patent Document 1: Japanese Kokai Publication Hei3-124440 (JP-A H03-124440)

SUMMARY OF THE INVENTION

Problems to be Solved by the Invention

The present invention has its object to provide an interlayer film for a laminated glass, which is excellent in penetration resistance, moisture resistance, and sound insulation.

Means for Solving the Problems

The present invention relates to an interlayer film for a laminated glass, comprising: a polyvinyl acetal resin; and a plasticizer, the plasticizer being represented by formula (1):

[Formula 1]

(1)

In formula (1), $R^1$ represents a phenyl group, $R^2$ represents an alkylene group having 2 to 4 carbon atoms, and n represents 4 to 6.

Hereinafter, the present invention will be described in detail.

The interlayer film for a laminated glass according to the present invention contains a polyvinyl acetal resin.

The hydroxyl group content in the polyvinyl acetal resin is not particularly limited. The desirable lower limit thereof is 18 mol %, and the desirable upper limit thereof is 38 mol %. The hydroxyl group content of less than 18 mol % may deteriorate moisture resistance of the interlayer film for a laminated glass. The hydroxyl group content of less than 18 mol % may also deteriorate penetration resistance of a laminated glass. The hydroxyl group content exceeding 38 mol % may greatly harden the interlayer film for a laminated glass, likely resulting in deterioration of sound insulation of a laminated glass.

The more desirable lower limit of the hydroxyl group content is 20 mol %, and the more desirable upper limit thereof is 36 mol %.

The hydroxyl group content in the polyvinyl acetal resin means a mole fraction that is determined by dividing the amount of an ethylene group having a hydroxyl group by the total amount of an ethylene group in the main chain. The amount of the ethylene group having a hydroxyl group is determined by measuring the amount of the ethylene group having a hydroxyl group in raw material polyvinyl alcohol according to "Testing Methods for Polyvinyl Alcohol" of JIS K 6726, for example.

The acetylation degree of the polyvinyl acetal resin is not particularly limited. The desirable lower limit thereof is 0.1 mol %, and the desirable upper limit thereof is 15 mol %. If the acetylation degree of the polyvinyl acetal resin is less than 0.1 mol %, a plasticizer may bleed out onto the surface from the inner side of the interlayer film. The acetylation degree of the polyvinyl acetal resin exceeding 15 mol % may deteriorate moisture resistance of the interlayer film for a laminated glass. The more desirable lower limit of the acetylation degree of the polyvinyl acetal resin is 0.3 mol %, and the more desirable upper limit thereof is 14 mol %.

The acetylation degree means a mole fraction that is determined by subtracting the amount of an ethylene group having an acetal group and the amount of an ethylene group having a hydroxyl group from the total amount of an ethylene group in the main chain, and dividing the subtracted value by the total amount of the ethylene group in the main chain.

The polyvinyl acetal resin is not particularly limited, and a polyvinyl butyral resin is desirable due to its excellent adhesion to glass plates.

The butyralization degree of the polyvinyl butyral resin is not particularly limited. The desirable lower limit thereof is 63 mol %, and the desirable upper limit thereof is 73 mol %. If the butyralization degree of the polyvinyl butyral resin is less than 63 mol %, a plasticizer may bleed out onto the surface from the inner side of the interlayer film. The butyralization degree of the polyvinyl butyral resin exceeding 73 mol % may deteriorate penetration resistance of a laminated glass. The more desirable lower limit of the butyralization degree of the polyvinyl butyral resin is 65 mol %, and the more desirable upper limit thereof is 69 mol %.

The butyralization degree means a mole fraction that is determined by dividing the amount of an ethylene group having a butyral group by the total amount of an ethylene group in the main chain. The amount of the ethylene group having a butyral group may be measured according to "Testing Methods for Polyvinyl Butyral" of JIS K 6728, for example.

The polyvinyl butyral resin is usually produced by butyralization of polyvinyl alcohol.

The polyvinyl alcohol is usually produced by saponification of polyvinyl acetate.

The polymerization degree of the polyvinyl alcohol is not particularly limited. The desirable lower limit thereof is 1000, and the desirable upper limit thereof is 4000. The polymerization degree of the polyvinyl alcohol of less than 1000 may deteriorate penetration resistance of a laminated glass. The polymerization degree of the polyvinyl alcohol exceeding 4000 may make the obtained polyvinyl acetal resin very rigid, likely resulting in difficulty in forming an interlayer film for a laminated glass. The more desirable lower limit of the polymerization degree of the polyvinyl alcohol is 1300, and the more desirable upper limit thereof is 3700.

The interlayer film for a laminated glass according to the present invention contains a plasticizer represented by formula (1). The plasticizer represented by formula (1) has a hydroxyl group. Thus, even with a small amount of the plasticizer, the interlayer film for a laminated glass excellent in sound insulation is obtainable. The reason for this is presumably because the intramolecular and intermolecular hydrogen bonds of the polyvinyl acetal resin become weaker.

[Formula 2]

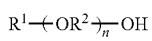
(1)

In formula (1), $R^1$ represents a phenyl group, $R^2$ represents an alkylene group having 2 to 4 carbon atoms, and n represents 4 to 6.

$R^1$ in formula (1) represents a phenyl group. The plasticizer represented by formula (1) has a phenyl group, and n represents 4 to 6. Thus, an interlayer film for a laminated glass, which is excellent in penetration resistance, moisture resistance, and sound insulation, is obtainable.

The symbol n in formula (1) represents 4 to 6. The n of less than 4 may deteriorate penetration resistance of the interlayer film for a laminated glass. The n exceeding 6 may deteriorate moisture resistance or sound insulation of the interlayer film for a laminated glass.

The symbol n in formula (1) shows the average addition number of moles of ($OR^2$) groups. The average addition number n of moles is determined by calculating the peak area ratio for each addition number of moles by gas chromatography analysis.

It is only necessary for the plasticizer represented by formula (1) to have an average addition number of moles of ($OR^2$) groups of 4 to 6. Thus, the plasticizer may comprise a plasticizer having an addition number of moles of less than 4 or a plasticizer having an addition number of moles exceeding 6, as long as the average addition number of moles is within the above range.

$R^2$ in formula (1) represents an alkylene group having 2 to 4 carbon atoms. Sound insulation may be insufficient if the alkylene group having 5 or more carbons. The alkylene group is desirably an alkylene group having 2 or 3 carbon atoms, and more desirably an alkylene group having 2 carbon atoms.

In the interlayer film for a laminated glass, the amount of the plasticizer represented by formula (1) is desirably 15 parts by weight in the lower limit, and 75 parts by weight in the upper limit, with respect to 100 parts by weight of the polyvinyl acetal resin. However, addition of the plasticizer represented by formula (1) may lower the glass transition temperature of the interlayer film for a laminated glass, thereby likely resulting in deterioration of penetration resistance of a laminated glass to be obtained. Accordingly, in order to achieve both excellent sound insulation and penetration resistance, it is desirable to adjust the amount of the plasticizer represented by formula (1) within a suitable range considering the combination of the plasticizer with the polyvinyl acetal.

If the polyvinyl acetal resin is, for example, a polyvinyl butyral resin A having a hydroxyl group content of 23 to 38 mol %, the amount of the plasticizer represented by formula (1) is desirably 33 parts by weight in the lower limit, and 75 parts by weight in the upper limit, with respect to 100 parts by weight of the polyvinyl butyral resin. The amount of the plasticizer of less than 33 parts by weight may deteriorate sound insulation of the interlayer film for a laminated glass. The amount of the plasticizer exceeding 75 parts by weight may not give sufficient penetration resistance of the laminated glass. The desirable lower limit of the amount of the plasticizer is 38 parts by weight, the desirable upper limit thereof is 71 parts by weight, the more desirable lower limit thereof is 45 parts by weight, and the more desirable upper limit thereof is 70 parts by weight.

The desirable lower limit of the hydroxyl group content in the polyvinyl butyral resin A is 28 mol %, the desirable upper limit thereof is 37 mol %, the more desirable lower limit thereof is 30 mol %, and the more desirable upper limit thereof is 36 mol %.

The polyvinyl butyral resin A is desirably a polyvinyl butyral resin obtainable through butyralization of polyvinyl alcohol having an average polymerization degree of 1300 to 4000.

If the polyvinyl acetal resin is a polyvinyl butyral resin B whose lower limit of the hydroxyl group content is 18 mol % and whose upper limit thereof is less than 23 mol %, or if the polyvinyl aceral resin is a polyvinyl acetal resin whose lower limit of the average polymerization degree is 1000, whose upper limit thereof is less than 1300, and whose hydroxyl group content is 23 to 35 mol %, the amount of the plasticizer represented by formula (1) is desirably 15 parts by weight in the lower limit, and 50 parts by weight in the upper limit, with respect to 100 parts by weight of the polyvinyl acetal resin. The amount of the plasticizer of less than 15 parts by weight may deteriorate sound insulation of the interlayer film for a laminated glass. The amount of the plasticizer exceeding 50 parts by weight may not give sufficient penetration resistance of the laminated glass. The desirable lower limit of the amount of the plasticizer is 25 parts by weight, the desirable upper limit thereof is 42 parts by weight, the more desirable lower limit thereof is 28 parts by weight, and the more desirable upper limit thereof is 40 parts by weight.

The desirable lower limit of the hydroxyl group content in the polyvinyl butyral resin B is 19 mol %, the desirable upper limit thereof is 22.5 mol %, the more desirable lower limit thereof is 20 mol %, and the more desirable upper limit thereof is 22 mol %.

The polyvinyl butyral resin B is desirably a polyvinyl butyral resin obtainable through butyralization of polyvinyl alcohol with an average polymerization degree of 1000 to 4000.

The interlayer film for a laminated glass according to the present invention may contain plasticizers other than that represented by formula (1) as long as they do not cause any adverse effect on the process for solving the problems of the present invention.

The plasticizers are not particularly limited. Examples thereof include diester compounds such as triethylene glycol di-2-ethylhexanoate and tetraethylene glycol di-2-ethylhexanoate.

Conventional interlayer films for a laminated glass contain metal salts such as an alkali metal salt and an alkaline earth metal salt for the purpose of reducing adhesion between an interlayer film for a laminated glass and glass plates. If the interlayer film for a laminated glass does not contain metal salts, adhesion between an interlayer film for a laminated glass and glass plates becomes so strong that penetration resistance of a laminated glass may be insufficient. However, the interlayer film for a laminated glass according to the present invention provides a laminated glass having excellent penetration resistance even if it does not contain the metal salts.

The interlayer film for a laminated glass according to the present invention may contain the metal salts, such as magnesium 2-ethylbutyrate and magnesium acetate. The amount of the metal salts is not particularly limited. The desirable upper limit thereof is 0.1 parts by weight with respect to 100 parts by weight of the polyvinyl acetal resin.

The interlayer film for a laminated glass according to the present invention may contain additives such as ultraviolet absorbers, antioxidants, light stabilizers, antistatic agents, pigments, dyes, and infrared absorption agents.

The thickness of the interlayer film for a laminated glass according to the present invention is not particularly limited. The desirable lower limit thereof is 0.3 mm, and the desirable upper limit thereof is 1.5 mm. Less than 0.3 mm thickness of the interlayer film for a laminated glass according to the present invention may deteriorate penetration resistance of the interlayer film for a laminated glass. More than 1.5 mm thickness of the interlayer film for a laminated glass according to the present invention may exceed a suitable thickness for a laminated glass. The more desirable lower limit of the thickness of the interlayer film for a laminated glass according to the present invention is 0.7 mm, and the more desirable upper limit thereof is 1.35 mm.

The interlayer film for a laminated glass according to the present invention desirably has a water content of 0.4% by weight in the lower limit, and 2.5% by weight in the upper limit. If the water content is less than 0.4% by weight, water absorption rate during storage of the interlayer film for a laminated glass is so high that it may be difficult to control the adhesion between a glass plate and an interlayer film for a laminated glass. The water content of less than 0.4% by weight may deteriorate sound insulation of a laminated glass to be obtained. If the water content exceeds 2.5% by weight, air bubbles may be formed in the interlayer film for a laminated glass or at the interface between the interlayer film and a glass plate when a laminated glass is kept at a temperature of 50° C. or higher. The more desirable lower limit of the water content is 0.5% by weight, the more desirable upper limit thereof is 2.45% by weight, the further more desirable lower limit thereof is 0.6% by weight, and the further more desirable upper limit thereof is 2.0% by weight.

The water content mentioned herein is measured by the following method.

A test piece of about 10 g is collected from an interlayer film for a laminated glass. The obtained test piece is allowed to stand in a desiccator, which includes silica gel, and the lid of the desiccator is firmly closed. Then, this desiccator is allowed to stand in a thermostatic chamber adjusted to 23° C. The interlayer film for a laminated glass is dried by this method. The interlayer film for a laminated glass has been dried until the weight change of the interlayer film stops. Thereafter, the weight of the interlayer film for a laminated glass is measured. The water content of the interlayer film for a laminated glass is determined by the following formula.

Water content of an interlayer film for laminated glass(% by weight)=[{(Weight of an interlayer film before drying treatment)−(Weight of an interlayer film after drying treatment)}×100]/(Weight of an interlayer film before drying treatment)

The water content of the interlayer film for a laminated glass according to the present invention may be adjusted by allowing the obtained interlayer film for a laminated glass to stand for a predetermined time period at a predetermined temperature and a predetermined humidity. The water content of the interlayer film for a laminated glass may be adjusted, for example, by allowing the interlayer film to stand for several hours to several days under constant temperature and humidity conditions, at a temperature of 23° C. and a relative humidity of 25%. The water content of the interlayer film for a laminated glass is adjusted by appropriately setting the temperature or the humidity.

The interlayer film for a laminated glass according to the present invention may be a single interlayer film for a laminated glass, or may comprise a multilayer laminated structure including two or more resin layers. If the interlayer film for a laminated glass according to the present invention comprises a multilayer structure, it is sufficient that at least one layer meets the requirements of the present invention.

If the interlayer film for a laminated glass according to the present invention comprises a multilayer structure, a resin layer containing the plasticizer represented by formula (1) may be laminated. One example is an interlayer film for a laminated glass comprising a three-layer structure in which an outermost layer, an intermediate layer, and an outermost layer are sequentially laminated. Such an interlayer film for a laminated glass comprising a multilayer structure is excellent not only in penetration resistance, moisture resistance, and sound insulation, but also in handleability.

The outermost layer desirably contains 30 to 50 parts by weight of the plasticizer represented by formula (1) with respect to 100 parts by weight of the polyvinyl acetal resin.

Examples of the polyvinyl acetal resin used in the outermost layer include a polyvinyl butyral resin which is produced through butyralization of polyvinyl alcohol with an average polymerization degree of 1300 to 4000 and has a hydroxyl group content of 23 to 38 mol %.

The intermediate layer desirably contains 45 to 80 parts by weight of the plasticizer represented by formula (1) with respect to 100 parts by weight of the polyvinyl acetal resin.

Examples of the polyvinyl acetal resin used in the intermediate layer include a polyvinyl butyral resin which is produced through butyralization of polyvinyl alcohol with an average polymerization degree of 1000 to 4000 and has a hydroxyl group content of 20 to 38 mol %, and a polyvinyl butyral resin which is produced through butyralization of polyvinyl alcohol with an average polymerization degree of 1000 to 1300 and has a hydroxyl group content of 23 to 35 mol %.

In the interlayer film for a laminated glass comprising a three-layer structure, the amount of the plasticizer represented by formula (1) in the intermediate layer is desirably larger than the amount of the plasticizer represented by formula (1) in the outermost layer.

The method for producing the interlayer film for a laminated glass according to the present invention is not particularly limited. One example which can be mentioned is a method in which a plasticizer, an additive (an optional component), and a polyvinyl acetal resin are kneaded, and thereafter an interlayer film for a laminated glass is formed. The kneading method is not particularly limited, and examples thereof include a method in which an extruder, a plastograph, a kneader, a Banbury mixer, a calender roll, or the like is used.

A laminated glass may be produced by using the interlayer film for a laminated glass according to the present invention.

A glass plate to be used for the laminated glass is not particularly limited, and a general transparent plate glass may be used. The transparent plate glass is not particularly limited, and examples of the transparent plate glass include inorganic glasses such as a float plate glass, a polished plate glass, a figured glass, a wired glass, a colored plate glass, a heat-absorbing glass, a heat-reflecting glass, and a green glass. Organic plastic plates made of polycarbonate, polyacrylate, or the like may also be exemplified.

Two or more kinds of glass plates may be used as the glass plate. For example, a laminated glass in which the interlayer film for a laminated glass of the present invention is sandwiched between an inorganic glass and an organic plastic plate may be exemplified.

The method for producing the laminated glass is not particularly limited, and conventional production methods may be used.

When the laminated glass is used as glass for vehicles, it may be used as a windshield, a side glass, a rear glass, or a roof glass.

Effects of the Invention

The present invention provides an interlayer film for a laminated glass, which is excellent in penetration resistance, moisture resistance, and sound insulation.

MODE FOR CARRYING OUT THE INVENTION

Hereinafter, the present invention will be described in further detail referring to the following examples. The present invention is not limited to these examples.

Example 1

(1) Production of Interlayer Film for Laminated Glass

A mixture containing 45 parts by weight of a plasticizer represented by formula (1) in which $R^1$ was a phenyl group, $R^2$ was an ethylene group, and the average addition number n of moles was 4, 0.2 parts by weight of 2,6-di-t-butyl-p-cresol (BHT) as an antioxidant, and 0.2 parts by weight of an ultraviolet absorber (TINUVIN 326, produced by Ciba Specialty Chemicals Inc.) were stirred at 80° C. for 30 minutes to give a plasticizer solution.

Then, 45.4 parts by weight of the plasticizer solution was sufficiently mixed with 100 parts by weight of a polyvinyl butyral resin (average polymerization degree: 1700, butyralization degree: 68.5 mol %, acetylation degree: 0.9 mol %, hydroxyl group content: 30.6 mol %) to produce a mixture. The mixture was extrusion-molded with an extruder so as to have a film thickness of 1.25 mm. Thus, an interlayer film for a laminated glass was produced.

Thus-produced interlayer film for a laminated glass was allowed to stand under a constant temperature and humidity condition, at a temperature of 23° C. and a relative humidity of 25%.

(2) Production of Laminated Glass

The obtained interlayer film for a laminated glass was sandwiched between two sheets of transparent float glass (30 cm in length×30 cm in width×2.3 mm in thickness) to form a laminated body. The obtained laminated body was temporarily press-bonded with a roller heated at 230° C. The temporarily-press-bonded laminated glass was press-bonded with an autoclave for 20 minutes at a temperature of 135° C. and a pressure of 1.2 MPa to produce a laminated glass.

Examples 2 to 48

Interlayer films for a laminated glass and laminated glasses were produced as in Example 1, except that the average addition number n of moles in formula (1) and the amount of a plasticizer were changed as shown in Table 1; and the water content was adjusted as shown in Table 1.

Example 49

An interlayer film for a laminated glass and a laminated glass were produced as in Example 1, except that the amount of a plasticizer was changed to the amount shown in Table 1; and the water content was adjusted as shown in Table 1.

Example 50

An interlayer film for a laminated glass and a laminated glass were produced as in Example 1, except that the polyvinyl butyral resin having an average polymerization degree of 1700, a butyralization degree of 63 mol %, an acetylation degree of 1 mol %, and a hydroxyl group content of 36 mol % was used as a polyvinyl butyral resin; the average addition number n of moles in formula (1) and the amount of a plasticizer were changed as shown in Table 1; and the water content was adjusted as shown in Table 1.

Examples 51 to 77

Interlayer films for a laminated glass and laminated glasses were produced as in Example 1, except that the polyvinyl butyral resin having an average polymerization degree of 2450, a butyralization degree of 66.5 mol %, and an acetylation degree of 13.4 mol %, and a hydroxyl group content of 20.1 mol % was used as a polyvinyl butyral resin; the average addition number n of moles in formula (1) and the amount of a plasticizer were changed as shown in Table 2; and the water content was adjusted as shown in Table 2.

Comparative Examples 1 to 14

Interlayer films for a laminated glass and laminated glasses were produced as in Example 1, except that the average addition number n of moles in formula (1) and the amount of a plasticizer were changed as shown in Table 3 and the water content was adjusted as shown in Table 3.

Comparative Examples 15 to 26

Interlayer films for a laminated glass and laminated glasses were produced as in Example 1, except that $R^1$ in formula (1) was changed to a benzyl group; the average addition number n of moles in formula (1) and the amount of a plasticizer were changed as shown in Table 3; and the water content was adjusted as shown in Table 3.

Comparative Examples 27 to 38

Interlayer films for a laminated glass and laminated glasses were produced as in Example 1, except that $R^1$ in formula (1) was changed to an n-hexyl group; the average addition number n of moles in formula (1) and the amount of a plasticizer were changed as shown in Table 4; and the water content was adjusted as shown in Table 4.

Comparative Examples 39 to 46

Interlayer films for a laminated glass and laminated glasses were produced as in Example 1, except that $R^1$ in formula (1) was changed to a methyl group; the average addition number n of moles in formula (1) and the amount of a plasticizer were changed as shown in Table 4; and the water content was adjusted as shown in Table 4.

Comparative Examples 47 to 52

Interlayer films for a laminated glass and laminated glasses were produced as in Example 1, except that $R^1$ in formula (1) was changed to an n-butyl group; the average addition number n of moles in formula (1) and the amount of a plasticizer were changed as shown in Table 4; and the water content was adjusted as shown in Table 4.

Comparative Examples 53 to 62

Interlayer films for a laminated glass and laminated glasses were produced as in Example 1, except that $R^1$ in formula (1) was changed to a 2-ethylhexyl group; the average addition number n of moles in formula (1) and the amount of a plasticizer were changed as shown in Table 4; and the water content was adjusted as shown in Table 4.
<Evaluation>
The following evaluations were made on the interlayer films for a laminated glass and laminated glasses obtained in Examples 1 to 77 and Comparative Examples 1 to 62. Tables 1 to 4 show the results.
(1) Water Content of Interlayer Film for Laminated Glass A test piece of about 10 g was collected from the interlayer film for a laminated glass. The obtained test piece was allowed to stand in a desiccator which included silica gel, and the lid of the desiccator was firmly closed. Then, this desiccator was allowed to stand in a thermostatic chamber adjusted to 23° C. The interlayer film for a laminated glass was dried by this method. The interlayer film for a laminated glass had been dried until the weight change of the interlayer film stopped. Thereafter, the weight of the interlayer film for a laminated glass was measured. The water content of the interlayer film for a laminated glass was determined by the following formula.

Water content of an interlayer film for laminated glass(% by weight)=[{(Weight of an interlayer film before drying treatment)−(Weight of an interlayer film after drying treatment)}×100]/ (Weight of an interlayer film before drying treatment)

(2) Evaluation of Sound Insulation of Laminated Glass

The obtained laminated glass was cut into a size of 4 cm in length×4 cm in width to produce a laminated glass for evaluating sound insulation. The laminated glass for evaluating sound insulation was vibrated with a vibration generator for a damping test (vibrator G21-005D, produced by Shinken Co., Ltd.). The vibration signals of the laminated glass for evaluating sound insulation were amplified with a mechanical impedance amplifier (XG-81, produced by RION Co., Ltd.). Subsequently, the vibration spectrum was analyzed with an FFT spectrum analyzer (FFT analyzer HP3582A, produced by Yokogawa Hewlett Packard). The loss coefficient was calculated based on the analysis.

A graph that illustrates the relationship between sound frequency (Hz) and sound transmission loss (dB) at 25° C. was drawn based on the ratio of the obtained loss coefficient to the resonance frequency of the glass, and, based on the graph, the minimum sound transmission loss (TL value) at a sound frequency within the range from 1000 to 4000 Hz was determined.
(3) Evaluation of Penetration Resistance of Laminated Glass The obtained laminated glass (300 mm in length×300 mm in width) was adjusted so as to have a surface temperature of 23° C. Subsequently, a rigid sphere having a mass of 2260 g and a diameter of 82 mm was dropped from a height of 4 m to the central point of the laminated glass in conformity with JIS R 3212. The same test was made for six sheets of laminated glass in total. The test result was evaluated as "pass" in the case where a rigid sphere did not penetrate through the laminated glass within 5 seconds after the impact of the rigid sphere on the laminated glass for all the six sheets of laminated glass. Also, the test result was evaluated as "fail" in the case where the number of sheets of the laminated glass through which a rigid sphere did not penetrate within 5 seconds after the impact of the rigid sphere was less than or equal to three. In the case where the number of sheets of the laminated glass through which a rigid sphere did not penetrate within 5 seconds after the impact of the rigid sphere was four, a retest was made for another six sheets of the laminated glass. In the case where the number of sheets of the laminated glass through which a rigid sphere did not penetrate within 5 seconds after the impact of the rigid sphere was five, one more sheet of the laminated glass was additionally tested; and the test result was evaluated as "pass" in the case where a rigid sphere did not penetrate through the additional sheet within 5 seconds after impact of the rigid sphere. In the same manner, a rigid sphere having a mass of 2260 g and a diameter of 82 mm was dropped from a height of 5 m to the central point of the laminated glass, and the obtained laminated glass was evaluated for penetration resistance.
(4) Evaluation of Moisture Resistance of Laminated Glass The obtained laminated glass was allowed to stand in a constant temperature-constant humidity bath at a temperature of 50° C. and a relative humidity of 95% for two weeks in conformity with JIS R 3212. Then, the distance of a portion whitened (distance of whitening) was measured from the periphery of the laminated glass. The laminated glass was evaluated as "o" in the case where the distance of whitening from the most whitened periphery was 5 mm or less, the laminated glass was evaluated as "Δ" in the case where the distance of whitening was more than 5 mm and 10 mm or less, and the laminated glass was evaluated as "×" in the case where the distance of whitening was more than 10 mm.

TABLE 1

| | Plasticizer | | | Water content of interlayer film (% by weight) | Mg amount/ ppm | Evaluation | | | |
|---|---|---|---|---|---|---|---|---|---|
| | R | n | Amount (parts by weight) | | | Sound insulation | Penetration resistance 4 m | 5 m | Moisture resistance |
| Example 1 | Phenyl group | 4 | 45 | 0.03 | 0 | 34 | Pass | Pass | o |
| Example 2 | | | | 0.55 | 0 | 36 | Pass | Pass | o |
| Example 3 | | | | 1.42 | 0 | 36 | Pass | Pass | o |
| Example 4 | | | | 2.31 | 0 | 36 | Pass | Pass | o |
| Example 5 | | | 50 | 0.05 | 0 | 35 | Pass | Pass | o |
| Example 6 | | | | 0.58 | 0 | 37 | Pass | Pass | o |
| Example 7 | | | | 1.41 | 0 | 37 | Pass | Pass | o |
| Example 8 | | | | 2.26 | 0 | 37 | Pass | Pass | o |
| Example 9 | | | 60 | 0.04 | 0 | 35 | Pass | Pass | o |
| Example 10 | | | | 0.58 | 0 | 37 | Pass | Pass | o |
| Example 11 | | | | 1.47 | 0 | 37 | Pass | Pass | o |
| Example 12 | | | | 2.47 | 0 | 37 | Pass | Pass | o |
| Example 13 | | | 70 | 0.05 | 0 | 35 | Pass | Pass | o |
| Example 14 | | | | 0.57 | 0 | 37 | Pass | Pass | o |
| Example 15 | | | | 1.54 | 0 | 37 | Pass | Pass | o |
| Example 16 | | | | 2.44 | 0 | 38 | Pass | Pass | o |
| Example 17 | Phenyl group | 5 | 45 | 0.03 | 0 | 35 | Pass | Pass | o |
| Example 18 | | | | 0.51 | 0 | 36 | Pass | Pass | o |
| Example 19 | | | | 1.40 | 0 | 36 | Pass | Pass | o |
| Example 20 | | | | 2.39 | 0 | 36 | Pass | Pass | o |
| Example 21 | | | 50 | 0.07 | 0 | 34 | Pass | Pass | o |
| Example 22 | | | | 0.51 | 0 | 36 | Pass | Pass | o |
| Example 23 | | | | 1.43 | 0 | 36 | Pass | Pass | o |
| Example 24 | | | | 2.45 | 0 | 37 | Pass | Pass | o |
| Example 25 | | | 60 | 0.04 | 0 | 35 | Pass | Pass | o |
| Example 26 | | | | 0.52 | 0 | 36 | Pass | Pass | o |
| Example 27 | | | | 1.47 | 0 | 37 | Pass | Pass | o |
| Example 28 | | | | 2.30 | 0 | 37 | Pass | Pass | o |
| Example 29 | | | 70 | 0.05 | 0 | 35 | Pass | Pass | o |
| Example 30 | | | | 0.55 | 0 | 37 | Pass | Pass | o |
| Example 31 | | | | 1.52 | 0 | 37 | Pass | Pass | o |
| Example 32 | | | | 2.37 | 0 | 38 | Pass | Pass | o |
| Example 33 | Phenyl group | 6 | 45 | 0.06 | 0 | 33 | Pass | Pass | o |
| Example 34 | | | | 0.54 | 0 | 35 | Pass | Pass | o |
| Example 35 | | | | 1.42 | 0 | 36 | Pass | Pass | o |
| Example 36 | | | | 2.46 | 0 | 36 | Pass | Pass | o |
| Example 37 | | | 50 | 0.03 | 0 | 34 | Pass | Pass | o |
| Example 38 | | | | 0.52 | 0 | 36 | Pass | Pass | o |
| Example 39 | | | | 1.44 | 0 | 36 | Pass | Pass | o |
| Example 40 | | | | 2.45 | 0 | 36 | Pass | Pass | o |
| Example 41 | | | 60 | 0.04 | 0 | 34 | Pass | Pass | o |
| Example 42 | | | | 0.56 | 0 | 36 | Pass | Pass | o |
| Example 43 | | | | 1.46 | 0 | 36 | Pass | Pass | o |
| Example 44 | | | | 2.40 | 0 | 36 | Pass | Pass | o |
| Example 45 | | | 70 | 0.04 | 0 | 34 | Pass | Pass | o |
| Example 46 | | | | 0.53 | 0 | 36 | Pass | Pass | o |
| Example 47 | | | | 1.55 | 0 | 37 | Pass | Pass | o |
| Example 48 | | | | 2.39 | 0 | 37 | Pass | Pass | o |
| Example 49 | Phenyl group | 4 | 38 | 1.37 | 0 | 34 | Pass | Pass | o |
| Example 50 | Phenyl group | 5 | 68 | 1.45 | 0 | 36 | Pass | Pass | o |

TABLE 2

| | Plasticizer | | | Mg amount/ ppm | Water content of interlayer film (% by weight) | Evaluation | | | |
|---|---|---|---|---|---|---|---|---|---|
| | R | n | Amount (parts by weight) | | | Sound insulation | Penetration resistance 4 m | 5 m | Moisture resistance |
| Example 51 | Phenyl group | 4 | 28 | 0 | 0.57 | 35 | Pass | Pass | Δ |
| Example 52 | | | | 0 | 1.63 | 35 | Pass | Pass | Δ |
| Example 53 | | | | 0 | 2.27 | 35 | Pass | Pass | Δ |
| Example 54 | | | 35 | 0 | 0.54 | 36 | Pass | Pass | Δ |
| Example 55 | | | | 0 | 1.68 | 37 | Pass | Pass | Δ |
| Example 56 | | | | 0 | 2.37 | 37 | Pass | Pass | Δ |
| Example 57 | | | 40 | 0 | 0.59 | 38 | Pass | Pass | Δ |

TABLE 2-continued

| | Plasticizer | | | Mg | Water content of | Evaluation | | | |
|---|---|---|---|---|---|---|---|---|---|
| | | | Amount | amount/ | interlayer film | Sound | Penetration resistance | | Moisture |
| | R | n | (parts by weight) | ppm | (% by weight) | insulation | 4 m | 5 m | resistance |
| Example 58 | | | | 0 | 1.71 | 39 | Pass | Pass | Δ |
| Example 59 | | | | 0 | 2.41 | 39 | Pass | Pass | Δ |
| Example 60 | Phenyl group | 5 | 28 | 0 | 0.54 | 35 | Pass | Pass | Δ |
| Example 61 | | | | 0 | 1.59 | 35 | Pass | Pass | Δ |
| Example 62 | | | | 0 | 2.49 | 36 | Pass | Pass | Δ |
| Example 63 | | | 35 | 0 | 0.62 | 36 | Pass | Pass | Δ |
| Example 64 | | | | 0 | 1.64 | 36 | Pass | Pass | Δ |
| Example 65 | | | | 0 | 2.28 | 37 | Pass | Pass | Δ |
| Example 66 | | | 40 | 0 | 0.51 | 38 | Pass | Pass | Δ |
| Example 67 | | | | 0 | 1.62 | 38 | Pass | Pass | Δ |
| Example 68 | | | | 0 | 2.36 | 38 | Pass | Pass | Δ |
| Example 69 | Phenyl group | 6 | 28 | 0 | 0.55 | 34 | Pass | Pass | Δ |
| Example 70 | | | | 0 | 1.61 | 35 | Pass | Pass | Δ |
| Example 71 | | | | 0 | 2.44 | 35 | Pass | Pass | Δ |
| Example 72 | | | 35 | 0 | 0.59 | 36 | Pass | Pass | Δ |
| Example 73 | | | | 0 | 1.62 | 36 | Pass | Pass | Δ |
| Example 74 | | | | 0 | 2.21 | 36 | Pass | Pass | Δ |
| Example 75 | | | 40 | 0 | 0.57 | 37 | Pass | Pass | Δ |
| Example 76 | | | | 0 | 1.66 | 38 | Pass | Pass | Δ |
| Example 77 | | | | 0 | 2.35 | 38 | Pass | Pass | Δ |

TABLE 3

| | Plasticizer | | | Water content of | Mg | Evaluation | | | |
|---|---|---|---|---|---|---|---|---|---|
| | | | Amount | interlayer film | amount/ | Sound | Penetration resistance | | Moisture |
| | R | n | (content) | (% by weight) | ppm | insulation | 4 m | 5 m | resistance |
| Comparative Example 1 | Phenyl group | 1 | 45 | 1.43 | 0 | 36 | Fail | Fail | ○ |
| Comparative Example 2 | | | 70 | 1.50 | 0 | 38 | Fail | Fail | ○ |
| Comparative Example 3 | | 2 | 45 | 1.40 | 0 | 36 | Fail | Fail | ○ |
| Comparative Example 4 | | | 70 | 1.52 | 0 | 38 | Fail | Fail | ○ |
| Comparative Example 5 | | 3 | 45 | 1.41 | 0 | 35 | Fail | Fail | ○ |
| Comparative Example 6 | | | 50 | 1.47 | 0 | 37 | Fail | Fail | ○ |
| Comparative Example 7 | | | 60 | 1.50 | 0 | 37 | Fail | Fail | ○ |
| Comparative Example 8 | | | 70 | 1.57 | 0 | 38 | Fail | Fail | ○ |
| Comparative Example 9 | | 7 | 45 | 1.43 | 0 | 35 | Pass | Pass | x |
| Comparative Example 10 | | | 50 | 1.45 | 0 | 36 | Pass | Pass | x |
| Comparative Example 11 | | | 60 | 1.49 | 0 | 36 | Pass | Pass | x |
| Comparative Example 12 | | | 70 | 1.47 | 0 | 37 | Pass | Pass | x |
| Comparative Example 13 | | 8 | 45 | 1.44 | 0 | 35 | Pass | Pass | x |
| Comparative Example 14 | | | 70 | 1.53 | 0 | 36 | Pass | Pass | x |
| Comparative Example 15 | Benzyl group | 3 | 45 | 1.43 | 0 | 35 | Fail | Fail | x |
| Comparative Example 16 | (7 carbon | | 70 | 1.56 | 0 | 38 | Fail | Fail | x |
| Comparative Example 17 | atoms) | 4 | 45 | 1.44 | 0 | 35 | Pass | Pass | x |
| Comparative Example 18 | | | 70 | 1.46 | 0 | 37 | Pass | Pass | x |
| Comparative Example 19 | | 5 | 45 | 1.41 | 0 | 36 | Pass | Pass | x |
| Comparative Example 20 | | | 70 | 1.48 | 0 | 37 | Pass | Pass | x |
| Comparative Example 21 | | 6 | 45 | 1.48 | 0 | 35 | Pass | Pass | x |
| Comparative Example 22 | | | 70 | 1.53 | 0 | 36 | Pass | Pass | x |
| Comparative Example 23 | | 7 | 45 | 1.42 | 0 | 35 | Pass | Pass | x |
| Comparative Example 24 | | | 70 | 1.52 | 0 | 37 | Pass | Pass | x |
| Comparative Example 25 | | 8 | 45 | 1.47 | 0 | 35 | Pass | Pass | x |
| Comparative Example 26 | | | 70 | 1.50 | 0 | 36 | Pass | Pass | x |

TABLE 4

| | Plasticizer | | | Water content of | Mg | Evaluation | | | |
|---|---|---|---|---|---|---|---|---|---|
| | | | Amount | interlayer film | amount/ | Sound | Penetration resistance | | Moisture |
| | R | n | (parts by weight) | (% by weight) | ppm | insulation | 4 m | 5 m | resistance |
| Comparative Example 27 | N-hexyl group | 2 | 45 | 1.44 | 0 | 36 | Fail | Fail | x |
| Comparative Example 28 | (6 carbon | | 70 | 1.50 | 0 | 38 | Fail | Fail | x |
| Comparative Example 29 | atoms) | 3 | 45 | 1.51 | 0 | 35 | Fail | Fail | x |
| Comparative Example 30 | | | 70 | 1.52 | 0 | 38 | Fail | Fail | x |
| Comparative Example 31 | | 5 | 45 | 1.46 | 0 | 36 | Pass | Pass | x |

TABLE 4-continued

| | Plasticizer | | | Water content of interlayer film (% by weight) | Mg amount/ ppm | Evaluation | | | |
|---|---|---|---|---|---|---|---|---|---|
| | R | n | Amount (parts by weight) | | | Sound insulation | Penetration resistance 4 m | Penetration resistance 5 m | Moisture resistance |
| Comparative Example 32 | | | 70 | 1.56 | 0 | 38 | Pass | Pass | x |
| Comparative Example 33 | | 6 | 45 | 1.40 | 0 | 36 | Pass | Pass | x |
| Comparative Example 34 | | | 70 | 1.51 | 0 | 37 | Pass | Pass | x |
| Comparative Example 35 | | 7 | 45 | 1.37 | 0 | 35 | Pass | Pass | x |
| Comparative Example 36 | | | 70 | 1.50 | 0 | 37 | Pass | Pass | x |
| Comparative Example 37 | | 8 | 45 | 1.49 | 0 | 35 | Pass | Pass | x |
| Comparative Example 38 | | | 70 | 1.55 | 0 | 37 | Pass | Pass | x |
| Comparative Example 39 | Methyl group | 3 | 45 | 1.48 | 0 | 37 | Fail | Fail | x |
| Comparative Example 40 | (1 carbon | | 70 | 1.48 | 0 | 39 | Fail | Fail | x |
| Comparative Example 41 | atom) | 4 | 45 | 1.42 | 0 | 37 | Fail | Fail | x |
| Comparative Example 42 | | | 70 | 1.52 | 0 | 38 | Fail | Fail | x |
| Comparative Example 43 | | 8 | 45 | 1.45 | 0 | 37 | Fail | Fail | x |
| Comparative Example 44 | | | 70 | 1.47 | 0 | 38 | Fail | Fail | x |
| Comparative Example 45 | | 9 | 45 | 1.46 | 0 | 37 | Pass | Pass | x |
| Comparative Example 46 | | | 70 | 1.50 | 0 | 38 | Pass | Pass | x |
| Comparative Example 47 | N-butyl group | 2 | 45 | 1.44 | 0 | 37 | Fail | Fail | x |
| Comparative Example 48 | (4 carbon | | 70 | 1.50 | 0 | 38 | Fail | Fail | x |
| Comparative Example 49 | atoms) | 3 | 45 | 1.40 | 0 | 36 | Fail | Fail | x |
| Comparative Example 50 | | | 70 | 1.53 | 0 | 38 | Fail | Fail | x |
| Comparative Example 51 | | 6 | 45 | 1.49 | 0 | 36 | Pass | Pass | x |
| Comparative Example 52 | | | 70 | 1.51 | 0 | 38 | Pass | Pass | x |
| Comparative Example 53 | 2-Ethylhexyl | 1 | 45 | 1.42 | 0 | 36 | Fail | Fail | x |
| Comparative Example 54 | group (8 | | 70 | 1.53 | 0 | 37 | Fail | Fail | x |
| Comparative Example 55 | carbon atoms) | 2 | 45 | 1.43 | 0 | 36 | Fail | Fail | x |
| Comparative Example 56 | | | 70 | 1.58 | 0 | 37 | Fail | Fail | x |
| Comparative Example 57 | | 4 | 45 | 1.47 | 0 | 35 | Pass | Pass | x |
| Comparative Example 58 | | | 70 | 1.58 | 0 | 36 | Pass | Pass | x |
| Comparative Example 59 | | 5 | 45 | 1.49 | 0 | 35 | Pass | Pass | x |
| Comparative Example 60 | | | 70 | 1.52 | 0 | 36 | Pass | Pass | x |
| Comparative Example 61 | | 6 | 45 | 1.44 | 0 | 35 | Pass | Pass | x |
| Comparative Example 62 | | | 70 | 1.57 | 0 | 36 | Pass | Pass | x |

Example 78

(1) Production of Resin Composition A

To 44 parts by weight of a plasticizer in formula (1) in which $R^1$ was a phenyl group, $R^2$ was an ethylene group, and the average addition number n of moles was 4 were added 0.2 parts by weight of 2,6-di-t-butyl-p-cresol as an antioxidant, 0.2 parts by weight of an ultraviolet absorber having a benzotriazol structure (TINUVIN 326, produced by Ciba Specialty Chemicals Inc.). The resultant mixture was stirred with a stirrer at 80° C. for 30 minutes to give a plasticizer solution.

The obtained plasticizer solution was sufficiently mixed with 100 parts by weight of a polyvinyl butyral resin (PVB) (average polymerization degree: 1700, butyralization degree: 68.5 mol %, hydroxyl group content: 30.6 mol %, acetyl group content: 0.9 mol %) to produce a resin composition A.

(2) Production of Resin Composition B

To 75 parts by weight of a plasticizer in formula (1) in which $R^1$ was a phenyl group, $R^2$ was an ethylene group, and the average addition number n of moles was 4 were added 0.2 parts by weight of 2,6-di-t-butyl-p-cresol as an antioxidant, and 0.2 parts by weight of an ultraviolet absorber having a benzotriazol structure (TINUVIN 326, produced by Ciba Specialty Chemicals Inc.). The resultant mixture was stirred with a stirrer at 80° C. for 30 minutes to give a plasticizer solution.

The obtained plasticizer solution was sufficiently mixed with 100 parts by weight of a polyvinyl butyral resin (PVB) (average polymerization degree: 1700, butyralization degree: 68.5 mol %, hydroxyl group content: 30.6 mol %, acetyl group content: 0.9 mol %) to produce a resin composition B.

(3) Production of Interlayer Film for Laminated Glass

The resin composition A and the resin composition B were co-extruded to produce an interlayer film for a laminated glass having a three-layer structure where a resin layer A (thickness: 150 μm), a resin layer B (thickness: 950 μm), and a resin layer A (thickness: 150 μm) were sequentially laminated.

(4) Production of Laminated Glass

The obtained interlayer film for a laminated glass was sandwiched between two sheets of transparent float glass (30 cm in length×30 cm in width×2.3 mm in thickness) to form a laminated body. The obtained laminated body was temporarily press-bonded with a roller heated at 230° C. The temporarily-press-bonded laminated glass was press-bonded with an autoclave for 20 minutes at a temperature of 135° C. and a pressure of 1.2 MPa to produce a laminated glass.

Examples 79 and 80

Interlayer films for a laminated glass and laminated glasses were produced as in Example 76, except that the average addition number n of moles in formula (1) was changed as shown in Table 5.

<Evaluation>

The interlayer films for a laminated glass and laminated glasses obtained in Examples 78 to 80 were evaluated as in Example 1. Table 5 shows the results.

TABLE 5

| | Composition of interlayer film for laminated glass | | | | Evaluation | | | |
| --- | --- | --- | --- | --- | --- | --- | --- | --- |
| | Resin composition A | | Resin composition B | | Sound | Penetration resistance | | Moisture |
| | Polyvinyl butyral resin | Plasticizer | Polyvinyl butyral resin | Plasticizer | insulation | 4 m | 5 m | resistance |
| Example 78 | Average polymerization degree: 1700 | R: phenyl group n = 4 | Average polymerization degree: 1700 | R: phenyl group n = 4 | 37 | Pass | Pass | ○ |
| Example 79 | Butyralization degree: 68.5 mol % | R: phenyl group n = 5 | Butyralization degree: 68.5 mol % | R: phenyl group n = 5 | 37 | Pass | Pass | ○ |
| Example 80 | Hydroxyl group content: 30.6 mol % Acetyl group content: 0.9 mol % | R: phenyl group n = 6 | Hydroxyl group content: 30.6 mol % Acetyl group content: 0.9 mol % | R: phenyl group n = 6 | 37 | Pass | Pass | ○ |

INDUSTRIAL APPLICABILITY

The present invention provides an interlayer film for a laminated glass, which is excellent in penetration resistance, moisture resistance, and sound insulation.

The invention claimed is:

1. An interlayer film for a laminated glass, which comprises:
a polyvinyl acetal resin; and
a plasticizer,
said plasticizer being represented by formula (1):

[Formula 1]

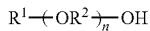

(1)

wherein $R^1$ represents a phenyl group, $R^2$ represents an alkylene group having 2 to 4 carbon atoms, and n represents 4 to 6.

2. The interlayer film for a laminated glass according to claim 1,
wherein an amount of the plasticizer represented by formula (1) is 15 to 75 parts by weight with respect to 100 parts by weight of the polyvinyl acetal resin.

3. The interlayer film for a laminated glass according to claim 1,
wherein the polyvinyl acetal resin has a hydroxyl group content of 18 to 38 mol %.

4. The interlayer film for a laminated glass according to claim 3,
wherein the polyvinyl acetal resin has an acetylation degree of 0.1 to 15 mol %.

5. The interlayer film for a laminated glass according to claim 1,
wherein the film has a water content of 0.4 to 2.5% by weight.

6. The interlayer film for a laminated glass according to claim 1,
wherein an amount of a metal salt is 0.1 parts by weight or less with respect to 100 parts by weight of the polyvinyl acetal resin.

7. The interlayer film for a laminated glass according to claim 1,
which comprises a multilayer laminated structure comprising two or more resin layers.

8. The interlayer film for a laminated glass according to claim 2,
wherein the polyvinyl acetal resin has a hydroxyl group content of 18 to 38 mol %.

9. The interlayer film for a laminated glass according to claim 2,
wherein the film has a water content of 0.4 to 2.5% by weight.

10. The interlayer film for a laminated glass according to claim 2,
wherein an amount of a metal salt is 0.1 parts by weight or less with respect to 100 parts by weight of the polyvinyl acetal resin.

11. The interlayer film for a laminated glass according to claim 2,
which comprises a multilayer laminated structure comprising two or more resin layers.

* * * * *